J. E. Buxton,
Seeder.
No. 112,541. Patented Mar. 14, 1871.

United States Patent Office.

JOHN E. BUXTON, OF OWATONNA, MINNESOTA.

Letters Patent No. 112,541, dated March 14, 1871.

IMPROVEMENT IN SEEDING-MACHINES.

The Schedule referred to in these Letters Patent and making part of the same.

*To all whom it may concern:*

Be it known that I, JOHN E. BUXTON, of Owatonna, in the county of Steele and State of Minnesota, have invented a new and improved Seeding-Machine; and I do hereby declare the following to be a full, clear, and exact description thereof, which will enable others skilled in the art to which my invention appertains to make and use the same, reference being had to the accompanying drawings forming part of this specification, in which—

Figure 1:
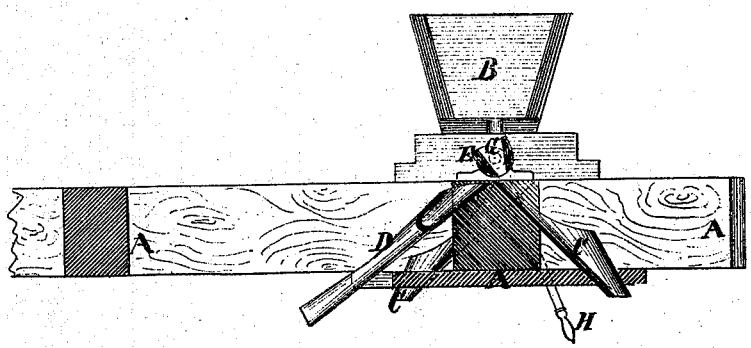
Figure 1 is a detail vertical longitudinal section of a seeding-machine adjusted for operation as a grain-drill.

Similar letters of reference indicate corresponding parts in the several figures of the drawings My invention has for its object to improve the means for converting a seeding-machine either into a grain-drill or broadcast seeder, at the will of the operator, whereby grain can be put into the ground in drills or sown broadcast, as circumstances may require. To this end—

It consists in a perforated bar, interposed between the hopper of the machine and the upper ends of the drill and broadcast spouts in such a manner that it can be turned in its bearings to direct the grain either into the drill-spouts or broadcast spouts, at the will of the operator.

In the drawings—

A is the frame-work of the machine, to which the plows, hoes, or cultivator-teeth are attached in the ordinary manner. It may be mounted upon wheels, or not, as desired.

B is the seed-hopper, placed transversely upon the frame, and provided with holes through the bottom, at such a distance apart as it is desired to have between the rows.

C are drill-spouts, placed transversely of the frame beneath the hopper, in inclined positions alternately to the front and rear, as shown, and arranged to register with the holes in the bottom of the hopper.

D are broadcast spouts, also arranged beneath the hopper transversely of the frame, and inclined to the front. Their upper ends are widened to receive the seed from the hopper.

These devices are not new, as above combined, and do not, therefore, constitute my present invention.

E is a bar, of wood or metal, placed transversely of the frame A, between the bottom of the hopper and the upper ends of the drill-spouts and broadcast spouts. It is hung in bearings, F, in the sides of the frame, in such a manner as to be capable of oscillatory motion.

This bar is provided with a series of transverse perforations, G, of the form of an inverted frustum of a cone, or wider at the top than at the bottom, and adapted to register with the holes in the bottom of the hopper.

Figure 2:
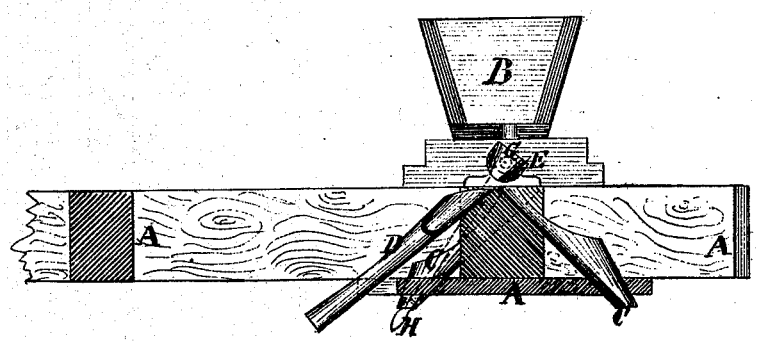
Figure 2 is a similar view of the machine adjusted for sowing broadcast.
Figure 3:
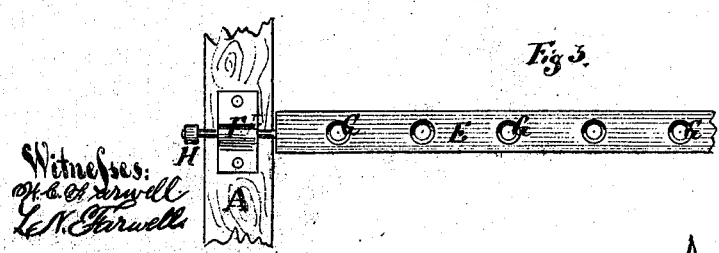
Figure 3 is a plan view of the perforated oscillatory bar, by which the machine is converted either into a grain-drill or broadcast seeder, at the will of the operator.

When the bar E is turned to occupy the position shown in fig. 1, it guides the seed from the hopper into the drill-spouts C, to be drilled into the ground; and when thrown into the position shown in fig. 2, the the seed is guided to the spouts D, to be sown broadcast.

The bar E may be turned in its bearings by any suitable means.

In this example of my invention a pendent lever-arm, H, is affixed to one of the journals of the bar, and is moved forward and backward, to change the position of the bar with respect to the drill and broadcast spouts, being limited in its movements by pins or stops affixed to the sides of the frame A.

By the use of the perforated oscillatory bar a seeding-machine can be converted, at will, either into a drill or broadcast seeder with the utmost expedition.

Having thus described my invention,

What I claim as new, and desire to secure by Letters Patent, is—

1. The perforated bar E, interposed between the bottom of the hopper and the spouts C D, and adapted to be turned in its bearings to direct the seed from the hopper through the holes G, either to the drill-spouts or broadcast spouts, substantially as described, for the purpose specified.

2. The perforated oscillatory-bar E, in combination with the drill-spouts C and broadcast spouts D, substantially as described, for the purpose specified.

J. E. BUXTON.

Witnesses:
M. M. SILSBEE,
C. HORSTMANN.